J. BAUM.
DETACHABLE BELT COUPLING.
APPLICATION FILED NOV. 13, 1911.
1,119,222.
Patented Dec. 1, 1914.
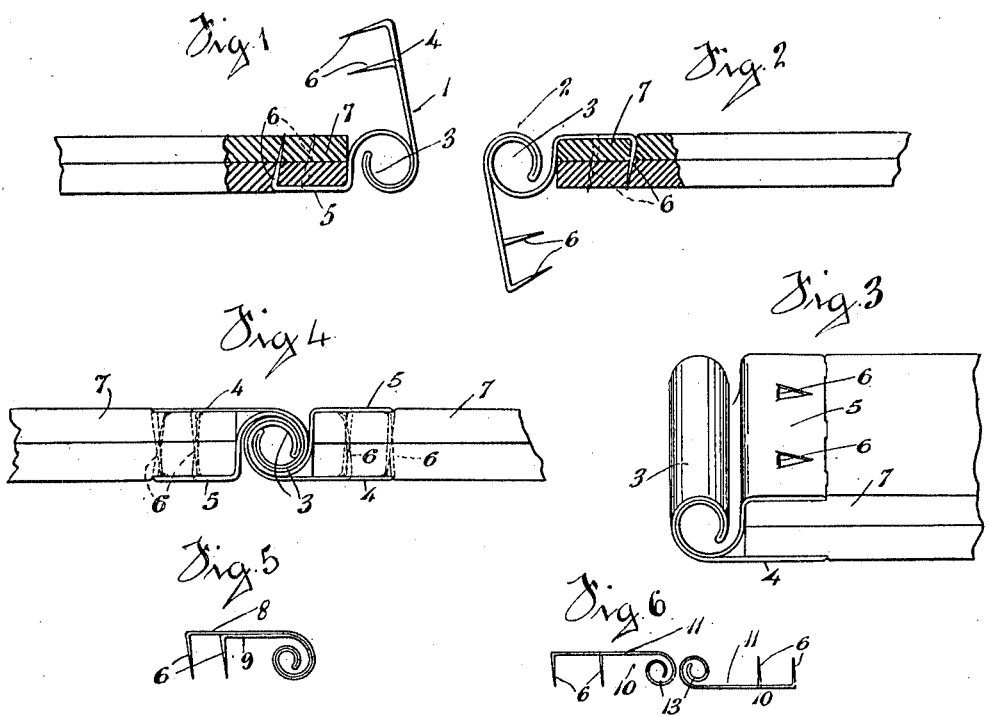

UNITED STATES PATENT OFFICE.

JACOB BAUM, OF CINCINNATI, OHIO.

DETACHABLE BELT-COUPLING.

1,119,222. Specification of Letters Patent. Patented Dec. 1, 1914.

Application filed November 13, 1911. Serial No. 659,939.

*To all whom it may concern:*

Be it known that I, JACOB BAUM, a citizen of the United States, residing at Cincinnati, in the county of Hamilton and State of Ohio, have invented certain new and useful Improvements in Detachable Belt-Couplings, of which the following is a specification.

My invention relates to means for coupling belts to be used for various purposes.

The object of my invention is to provide a simple, efficient and economically constructed detachable coupling which is adapted to be easily and conveniently applied to the belt and removed therefrom when desired and which is adapted to be readily coupled and uncoupled for the purpose of removing, reversing or twisting the belt.

In the accomanying drawing, which serves to illustrate the construction, application and use of my invention: Figure 1 is a side elevation showing one of the coupling members partly placed in position upon the end of a belt, partly in section; Fig. 2 shows the coöperating member in a similar position upon the other end of the belt, partly in section; Fig. 3 is a perspective view showing one of the coupling members secured in position upon the end of a belt and ready to be coupled to the other end of a belt having a like coupling member secured thereto; Fig. 4 is a side elevation showing the coupling members secured upon the ends of the belt and coupled together; Fig. 5 is a side elevation of a modified form of coupling member, the same being formed of a flat plate bent upon itself to form the curved hook and double jaw secured to the belt at one side thereof; Fig. 6 is a side elevation showing two coupling members each formed of a flat plate or jaw having integrally formed teeth adapted to engage a belt and secure said jaw thereto and each having an integrally formed curved hook adapted to engage the curved hook of the other coupling member.

In the embodiment of my invention, as illustrated in Figs. 1 to 4 inclusive, 1 represents a coupling member and 2 the coöperating coupling member each of said coupling members being formed of flat sheet steel or other suitable material folded upon itself a portion of its length and curved in said folded portion to form a curved hook or roll clutch 3 of substantially spiral cross-section which is adapted to enter and receive a like hook or roll clutch 3 of the other coöperating coupling member. Each of said members is spread apart the remainder of its length to form clamping jaws 4 and 5 each of which is provided with integrally formed pointed teeth 6 extending at an angle from the jaw and toward the other jaw and each adapted to be driven into the end portion of the belt 7 and clenched therein by the ends of said teeth striking the opposite jaw which serves as an anvil to turn said teeth into holding engagement with the belt. Part of the teeth 6 are preferably stamped out of the body of the plate or jaw and part are formed upon the edge thereof and said teeth of the respective jaws are preferably arranged in staggered form so as to enter said belt at different points and thereby not conflict with each other. By projecting the outer or end teeth at an acute angle to the plate or jaw causes the points thereof to engage the under surface of the opposite plate or jaw and this causes the ends of the teeth to turn and clench the belt. When the coupling members are formed, as shown in Figs. 1 and 2, they are secured to the respective ends of the belt 7 by first driving the teeth upon the edge thereof and said teeth of the belt as shown in Figs. 1 and 2 and then bending the other jaw downwardly toward the belt and driving the teeth thereof into the belt until the teeth are clenched therein in the manner shown in Fig. 3. After the coupling members are secured in position in the manner shown in Fig. 3 they are connected together in the manner shown in Fig. 4 by simply sliding the hook portions endwise into each other so that the outer surface and inner surface of each hook engages the outer and inner surfaces, respectively, of the other hook and each bears snugly against the other, thus producing a clutch connection and preserving the flexible characteristics of the belt.

It is apparent that my invention is capable of some modification without departure from the spirit or scope thereof, as shown by Fig. 5 in which the jaws 8 and 9 are folded upon each other and are adapted to be placed upon one side only of the belt and to have the teeth 6 extend into the belt from only one side; or said members may be formed in the manner shown in Fig. 6 in which the coupling member 10 consists of a flat plate 11 having integrally formed teeth 6 adapted to be secured to the belt 7 and having its free end curved to form a hook or roll clutch 13 substantially as shown in Fig. 6.

My structure is exceedingly strong and durable and possesses all of the meritorious features requisite for a highly efficient detachable belt coupling.

It will be noted that my coupling members can be very easily and cheaply formed of sheet steel, each member being complete in a single piece and that the same can be easily and quickly secured upon the end of the belt by any person at a moment's notice by simply using a hammer, each pair of coupling members being placed so that the hook 3 of each member extends in the reverse direction to the hook of the coöperating member so that when the ends of the belt are brought together said hook members will interengage each other to complete the formation of the belt.

Desirable features of my invention are neatness in appearance, compactness, cheapness in construction, simplicity and convenience in applying, and durability in use.

An important feature of my invention consists in securing the teeth to the belt extremely near its ends.

Another important feature of my invention when constructed with double jaws is that the teeth are curved and protected from injuring either the machinery or operators of the machinery and there is no projecting or protruding parts to cause said coupling members to become detached from the belt. As shown in the drawing, this form of coupling member is adapted to be readily secured to belts of more than one ply.

The construction shown in Figs. 1 and 2 is specially adapted for heavy belts where great strength is essential. The forms of coupling shown in Figs. 5 and 6 are intended for lighter belts or when it is desired to still further reduce the cost of construction.

It will be seen that my detachable coupling permits of the ready and convenient connecting and disconnecting of the ends of the belt for the purpose of placing it in position for use or removing it therefrom or for turning or twisting it as may be desired.

If it should be desired to secure the coupling members 1 and 2 in position upon the belt in such a manner that they may be removed and used over again in shortening the belt or upon new belts this may be accomplished by forming the teeth 6 of shorter length so that they will not strike the opposite jaw and clench in the manner hereinbefore described thus permitting the teeth 6 to be readily withdrawn from the belt 7 and the jaws removed from the belt whereby said coupling members may be used over again.

I claim:

1. In a detachable belt coupling, the combination of two substantially identical inversely presented coupling members, each comprising means to be attached to a side of the belt near its end and comprising a hook of substantially spiral cross section with its axis running along the end of the belt, the hooks of the respective members receiving each other, and their respective spiral cross sections precluding their radial or tangential displacement from each other, but said hooks being capable of swiveling movement in each other and of axial movement in each other, for the purposes set forth.

2. In a detachable belt coupling, the combination of two substantially identical inversely assembled coupling members, each comprising flat plates to lie upon opposite sides of the belt near its end, and prongs on the plates to pass through the belt, the prongs on each plate being offset from the prongs on the other plate, so that they do not meet, but that the ends of the prongs on each plate meet with and are clenched by the other plate on its side next to the belt, and each member also comprising a hook of double thickness formed by continuations of said plates pressed closely together and bent into substantially spiral cross section with the axis of said cross section running along the end of the belt, said hooks of the two members interlocking.

JACOB BAUM.

Witnesses:
JAMES N. RAMSEY,
GOLDIE GORDON.